(12) United States Patent  
Chan et al.

(10) Patent No.: US 6,947,766 B2  
(45) Date of Patent: Sep. 20, 2005

(54) MULTIPLE FUNCTIONS TRANSMITTING APPARATUS FOR MOBILE PHONE

(75) Inventors: Kok-Kan Chan, Hsi Chih (TW); Wei-Shao Chiu, Hsinchu (TW)

(73) Assignee: Quanta Computer Inc., Taoyuan Hsien (TW)

( * ) Notice: Subject to any disclaimer, the term of this patent is extended or adjusted under 35 U.S.C. 154(b) by 478 days.

(21) Appl. No.: 10/302,828

(22) Filed: Nov. 25, 2002

(65) Prior Publication Data

US 2004/0198442 A1 Oct. 7, 2004

(30) Foreign Application Priority Data

Sep. 13, 2002 (TW) .......................... 91121075 A

(51) Int. Cl.⁷ .......................... H04B 1/38; H01R 24/04
(52) U.S. Cl. .......................... 455/557; 439/668
(58) Field of Search .......................... 455/556.1, 556.2, 455/557, 569.1, 575.1, 90.2, 90.3, 344, 351, 347; 439/180, 386, 668, 669

(56) References Cited

U.S. PATENT DOCUMENTS

| | | | | |
|---|---|---|---|---|
| 4,369,521 A | * | 1/1983 | Sawada | 455/351 |
| 4,792,986 A | * | 12/1988 | Garner et al. | 455/90.2 |
| 5,797,102 A | * | 8/1998 | Hallikainen et al. | 455/557 |
| 6,149,469 A | * | 11/2000 | Kim | 439/668 |
| 6,626,706 B2 | * | 9/2003 | Siddiqui et al. | 439/668 |

* cited by examiner

*Primary Examiner*—Quochien B. Vuong

(57) ABSTRACT

A multiple functions transmitting apparatus for mobile phones is described. The apparatus has a tubal socket and a column terminal. The tubal socket has a power contact point, an identification contact point, a first signal contact point, a second signal contact point, and a ground contact point. The column terminal has an identification transmission contact point, a first signal transmission contact point, a second signal transmission contact point, and a ground transmission contact point, and a plurality of isolating element. The column terminal further comprises a power transmission contact point. The identification contact point and an identification voltage provide messages to distinguish types of peripheral devices and supply the transmitting service according to the type of peripheral device. The apparatus with a compact size and good contact point quality can charge the mobile phone and identify the peripheral devices.

20 Claims, 3 Drawing Sheets

MULTIPLE FUNCTIONS TRANSMITTING APPARATUS FOR MOBILE PHONE

FIELD OF THE INVENTION

The present invention relates to a multiple functions transmitting apparatus and especially to a multiple functions transmitting apparatus for a mobile phone.

BACKGROUND OF THE INVENTION

The telecommunication industry expands very fast, and the wireless telecommunication industry is growing especially rapidly. Every telecommunication company is vying for a larger share of the market. From the telephone system company to the telephone equipment maker and further to the telephone service company, all the sectors of the telecommunication industry are doing their best to win this war.

In the wireless telecommunication field, data can be received and transmitted via the wireless data transmission, such as the current prices of stocks, E-mail, voice mail, information searches and so on. Therefore, a telephone maker not only designs a mobile phone, with the usual characteristics of being light, thin, short and small, but also a mobile phone with pocket personal computer function, dual-way transmission function and internet function.

Mobile phones are thus used not only for traditional voice transmissions but also for data transmission. E-mail and image transmission in mobile phones are increasingly popular.

In addition to wireless data transmission, the mobile phone provides a transmission wire to input and output data and message. The transmission wire supplies voice and data transmission, and further includes the power supply. A traditional transmission wire includes a connector with multiple parallel contacts or an earphone connector. Referring to FIGS. 1A and 1B, FIG. 1A is a traditional mobile phone connector with multiple parallel contacts and FIG. 1B is a traditional earphone connector. The connector with multiple parallel contacts has the functions of power supply, battery charge, handsfree headset, data transmission interface, and peripheral device identification and control. A connector with multiple parallel contacts is larger in size and consequently higher in price. The contact quality of the connector with multiple parallel contacts is sub-optimal, especially when used while in motion.

The earphone connector is compact in size and has a better contact quality. The earphone connector supplies a few functions such as of power supply, handsfree headset, and simple data transmission, but the earphone connector cannot provide the functions of battery charge and peripheral device identification and control.

Hence, the mobile phone maker and users seek a connector which can charge batteries and identify and control peripheral devices, as well as be compact in size and have good contact quality.

SUMMARY OF THE INVENTION

One object of the present invention is to provide an earphone-type of multiple functions connector with a compact size and good contact quality.

Another object of the present invention is to provide an earphone-type of multiple functions connector with functions of peripheral devices identification and control.

A further object of the present invention is to provide a compact size earphone-type of multiple functions connector for a mobile phone with functions of peripheral devices identification and control, as well as battery charge.

The present invention provides a multiple functions transmitting apparatus of a mobile phone. The multiple functions transmitting apparatus utilizes a tubal socket and a column terminal for connecting a peripheral device with the mobile phone. The tubal socket comprises a power contact point, an identification contact point, a first signal contact point, a second signal contact point, and a ground contact point. These contact points are positioned in the tubal socket and isolated from each other. The power contact point supplies an electric power between the mobile phone and the peripheral device. The identification contact point identifies the type of peripheral device. The first signal contact point and the second signal contact point transmit signals for the mobile phone and the peripheral device. The ground contact point is a system ground of the mobile phone.

The column terminal comprises an identification transmission contact point, a first signal transmission contact point, a second signal transmission contact point, a ground transmission contact point, and a plurality of isolating elements. These contact points are isolated by the isolating elements and these contact points and these isolating elements are constructed the column terminal. The identification transmission contact point has a recognizable shape for identifying types of peripheral devices. The first signal transmission contact point and the second signal transmission contact point transmit the signal for the mobile phone and the peripheral device. The ground transmission contact point connects the system ground of the mobile phone. The column terminal further comprises a power transmission contact point to supply power between the mobile phone and the peripheral device. When the column terminal and the tubal socket connect together, the contact points connect with each of the corresponding transmission contact points. The identification transmission contact points for peripheral devices of different types are provided with different identifying shapes respectively to distinguish the different peripheral devices.

When the identification transmission contact point has a small diameter on the column terminal, the peripheral device is a microphone. The mobile phone supplies power to the microphone by way of the identification contact point and the identification transmission contact point. The microphone belongs to a handsfree headset of the mobile phone. The first signal and second signal are the right and left audio signal of the handsfree headset.

When the identification transmission contact point has a normal diameter, the mobile phone detects the voltage of the power contact point. If the voltage of the power contact point is higher than a predetermined voltage value, the peripheral device is a power supplier to charge the mobile phone. If the voltage of the power contact point is lower than the predetermined voltage value, the peripheral device is determined according to a voltage signal of the identification contact point. The voltage signal is set to different corresponding voltage values for different peripheral devices respectively to distinguish the peripheral devices. The power contact point also supplies an electric power output to the peripheral device according to the voltage signal. The voltage signal also includes a corresponding digital signal of the peripheral device to distinguish the peripheral device.

The tubal socket and the column terminal include a cylindrical socket and a cylindrical column terminal, a square tubal socket and a square column terminal, or a polygonal tubal socket and a polygonal column terminal.

The ground contact point further comprises an electrical detecting device to detect types of the peripheral devices.

Therefore, the multiple functions transmitting apparatus according to the present invention can charge the battery of the mobile phone, provide the power for the mobile phone, and identify and control the peripheral device via a compact size connector with good contact point quality, and the production cost can be reduced.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1A:
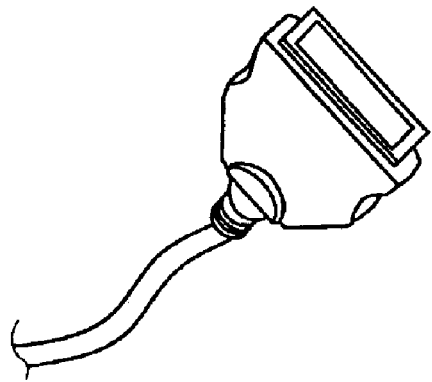
FIG. 1A is a traditional mobile phone connector with multiple parallel contacts.
Figure 1B:
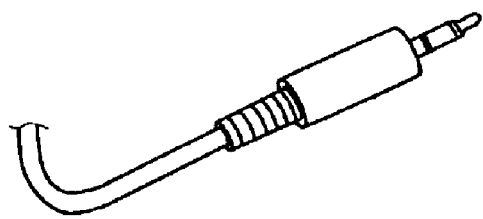
FIG. 1B is a traditional earphone connector.
Figure 2:
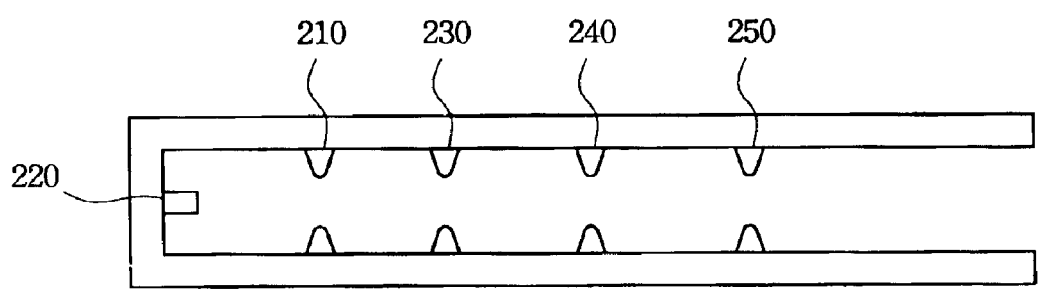
FIG. 2 is schematic diagram of contact positions of the socket of the multiple functions transmitting apparatus according to the present invention.

FIG. 2 is schematic diagram of contact positions of the socket of the multiple functions transmitting apparatus according to the present invention. The socket of the multiple functions transmitting apparatus is a tubal socket. The socket includes contact positions 210–250. The contact positions 210–250 show positions of the contact points of the socket. By way of these contact points, the multiple functions transmitting apparatus provides a power supply, handsfree headset, data transmission interface, peripheral devices identification and control, and battery charger.

Figure 3A:
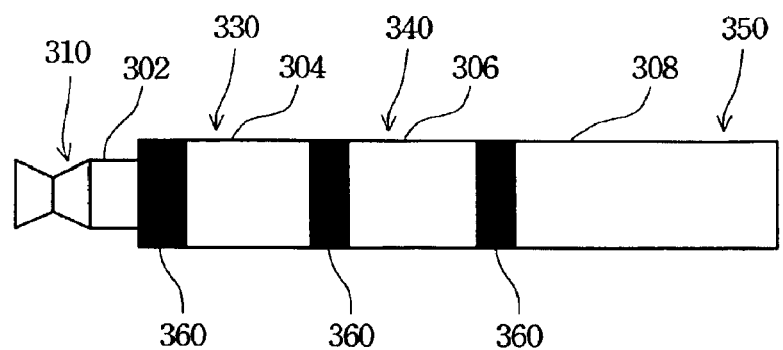
FIG. 3A is a schematic diagram of one embodiment of the multiple functions transmitting apparatus according to the present invention.

FIG. 3A is a schematic diagram of one embodiment of the multiple functions transmitting apparatus according to the present invention. The embodiment is an input and output connector of handsfree headset. As the drawing shows, the contact positions 310, 330, 340, and 350 correspond to the contact positions 210, 230, 240 and 250 (FIG. 2), respectively. In the practical function description, the input and output connector includes a microphone contact point 302, a first audio signal output contact point 304, a second audio signal output contact point 306, a ground contact point 308, and a plurality of isolating elements 360. The first audio signal output contact point 304 and the second audio signal output contact point 306 output the audio signals of right channel and left channel. The microphone contact point 302 inputs the voice signal to the mobile phone and the ground contact point 308 connects with the ground of the system.

The isolating elements 360 are utilized to isolate the contact points from interference and shorts.

Comparing the contact points of FIG. 2 and FIG. 3A, the contact position 220 of FIG. 2 connects no contact position of FIG. 3A when the input and output connector of FIG. 3A is inserted into the socket of FIG. 2. The contact position 220 is used to transfer the electric power to/from the peripheral device. In this embodiment, the connector lacks this function because the peripheral device is a handsfree headset. Therefore, the connector is shorter than the socket to avoid the connector contacting the contact position 220 of the socket. The microphone contact point 302 at the contact position 310 is obviously smaller than the other contact points of the connector. The contact position 210 includes a mechanical detecting device to recognize the peripheral device by way of identification of the connector diameter. Therefore, the contact position 210 receives an output voltage of about 1.2 V to 1.5 V for the microphone. By way of detecting the size of the connector at the contact position 310, the contact position 210 switches different circuits to perform different functions. For example, the signal from the contact position 310 transfers to the microphone circuit in the mobile phone when the size of the contact position 310 is smaller. The working circuit in the mobile phone changes to the other predetermined function circuit when the contact position 310 is not smaller, such as the embodiments of FIG. 3B and FIG. 3C. The contact position 310 can push the contact position 210 out, and then a mechanical switch changes the contact position 210 to connect the other predetermined function circuit. Therefore, the mobile phone can distinguish the different peripheral devices with different connectors.

Because of the skillful design thereof, the socket according to the present invention is compatible with a traditional connector of the handsfree headset. The traditional connector inserted into the socket according to the present invention works smoothly. Therefore, the multiple functions transmitting apparatus according to the present invention has an excellent compatibility.

The contact position 330 connects with the contact position 230 to deliver the first audio signal to the earphone of the handsfree headset. The contact position 340 connects with the contact position 240 to deliver the second audio signal to another earphone of the handsfree headset. Hence, the mobile phone can receive the radio signal and deliver the signal to traditional earphones connected with the socket according to the present invention or traditional earphones of the handsfree headset connected with the socket according to the present invention, and then the user can hear a radio program with the mobile phone having the socket according to the present invention and the traditional earphone which has the traditional connector. The contact position 250 connects with the contact position 350 to connect the peripheral device to the system ground.

Figure 3B:
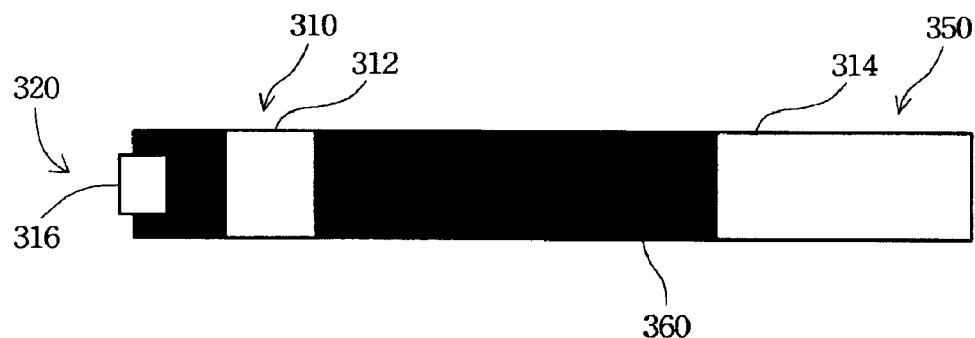
FIG. 3B is a schematic diagram of another embodiment of the multiple functions transmitting apparatus according to the present invention.

FIG. 3B is a schematic diagram of another embodiment of the multiple functions transmitting apparatus according to the present invention. The embodiment is a connector of a power supplier. The connector delivers the electric power for the mobile phone. The multiple functions transmitting apparatus has different shapes such as a cylinder column. The electronic parts of the mobile phone may be damaged if the other contact positions, such as the contact positions 210, 230, 240 and 250, of the connector touch the power input contact point 316. To avoid damage, the embodiment according to the present invention hides the power input contact point inside the cylinder column. Therefore, the power input contact point 316 can only connect with contact positions other than the contact positions 210, 230, 240, and 250, which is to say, contact position 220. The electronic parts of the mobile phone are protected efficiently. In this moment, the contact position 310 and the contact position 350 represent the identification contact point 312 and ground contact point 314. In this embodiment, the contact positions 210 and 250 include electronic detecting devices, mechanical detecting devices or the combinations thereof. The contact positions 210 and 250 detect and control the actual peripheral devices connecting with the mobile phone. As in the previous description, the contact position 210 with the mechanical detecting device detects the cylinder column diameter at the contact position 310 if the cylinder column of the connector inserts into the socket. The detecting device finds the diameter is a standard size of the cylinder column and not smaller. Therefore, the detecting device recognizes that the peripheral device is not a microphone and the contact position 310 need not deliver the electric power for the microphone. The contact position 270 receives a 5-volt input electric power and therefore the mobile phone switches to a power input status to charge the batteries or directly use the electric power.

Figure 3C:
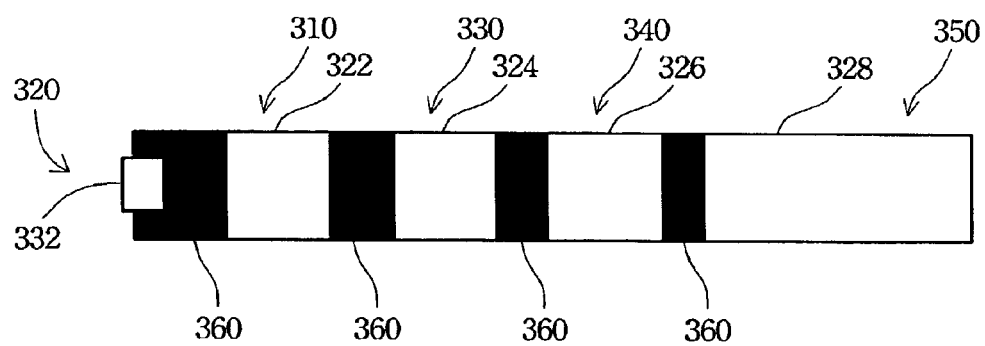
FIG. 3C is a schematic diagram of a further embodiment of the multiple functions transmitting apparatus according to the present invention.

FIG. 3C is a schematic diagram of a further embodiment of the multiple functions transmitting apparatus according to the present invention. The embodiment is a connector for electric power output and signal input and output to provide the electric power for a peripheral device and the data transmission between the peripheral device and a mobile phone. When the contact position 210 finds the diameter of the contact position 310 is a normal size and the contact position 220 does not receive an electrical power input, the contact position 210 switches to an electrical detecting device to detect whether the contact position 310 is transmitting a voltage signal input or not. If the contact position 310 is transmitting a voltage signal input to the contact position 210, the electrical detecting device at the contact position 210 further recognizes the type of the peripheral device, such as a digital camera or an external bluetooth transmission device according to the value of the voltage signal. Normally, the contact position 250 is a system ground. The contact position 250 also includes an electrical detecting device to detect the type of the peripheral device when the contact position 210 is set to a system ground.

That is to say, if the diameter of the identification contact 322 is a normal size, not a smaller diameter, and the voltage of the power output contact point 332 is smaller than a predetermined voltage value, for example 3.2 V is smaller than a predetermined voltage value 4.5V–5V, the contact position 210 detects the type of the peripheral device according to the value of the voltage signal of the identification contact point 322. For example, if the value of the voltage signal of the identification contact point is about 3 V, the peripheral device is a digital camera, and if the value is 4 V, the peripheral device is a bluetooth device. The electrical detecting device of the contact position 210 can be a digital device to detect the peripheral device according to the digital signal from the identification contact point 322. After the type of the peripheral device is recognized, the power output contact point 332 provides electric power to the peripheral device and the signal input contact point 324 and the signal output contact point 326 provides the data transmission between the mobile phone and the peripheral device. The ground contact point 328 is used to connect with the system ground. The isolating elements 360 separate the contact points. As in above description, the ground contact point 328 and the identification contact point 322 can be switched.

The present invention utilizes the mechanical detecting device and the electrical detecting device to distinguish the peripheral device. The cylinder column terminal and the tubal socket of the multiple functions transmitting apparatus according to the present invention provide more functions, better strength, better contact quality and lower cost than the traditional connector does. Therefore, the multiple functions transmitting apparatus according to the present invention provides the functions of device identification, power input and output, and data transmission for the mobile phone and the peripheral device. Furthermore, the dimension thereof is compact and convenient for the mobile phone. Hence, the mobile phone and the peripheral device are easier to connect together. The terminal and the socket are not limited to a cylinder column terminal and a tubal socket. A square type or polygonal type also work well for the present invention. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A multiple functions transmitting apparatus of a mobile phone to utilize a tubal socket and a column terminal for connecting a peripheral device with the mobile phone, the multiple functions transmitting apparatus comprising:

a power contact point supplying a power between the mobile phone and the peripheral device;

an identification contact point for identifying types of peripheral devices;

a first signal contact point transmitting a first signal between the mobile phone and the peripheral device;

a second signal contact point transmitting a second signal between the mobile phone and the peripheral device; and a ground contact point coupling with a ground of the mobile phone, wherein the power contact point, the identification contact point, the first signal contact point, the second signal contact point, and the ground contact point are positioned in the tubal socket and isolated from each other.

2. The multiple functions transmitting apparatus of claim 1, wherein the column terminal comprises a plurality of transmission contact points, each transmission contact point corresponds with one contact point in the tubal socket, and the transmission contact point corresponding with the identification contact point includes an identifying shape to distinguish the peripheral device.

3. The multiple functions transmitting apparatus of claim 2, wherein the column terminal further comprises a plurality of isolating elements separating the transmission contact points.

4. The multiple functions transmitting apparatus of claim 2, wherein the identifying shape includes the identification transmission contact point with a small diameter on the column terminal when the peripheral device is a microphone, and the mobile phone supplies power to the microphone by way of the identification contact point and the identification transmission contact point.

5. The multiple functions transmitting apparatus of claim 4, wherein the microphone belongs to a handsfree headset of the mobile phone.

6. The multiple functions transmitting apparatus of claim 5, wherein the first signal is a first audio signal of the handsfree headset of the mobile phone.

7. The multiple functions transmitting apparatus of claim 5, wherein the second signal is a second audio signal of the handsfree headset of the mobile phone.

8. The multiple functions transmitting apparatus of claim 2, wherein the identifying shape includes a normal diameter identification transmission contact point on the column terminal, wherein:
when a voltage of the power contact point is higher than a predetermined voltage value, the peripheral device is a power supplier to charge the mobile phone; and
when the voltage of the power contact point is lower than the predetermined voltage value, the peripheral device is determined according to a voltage signal of the identification contact point.

9. The multiple functions transmitting apparatus of claim 8, wherein the voltage signal is set a corresponding voltage value of the peripheral device to distinguish the peripheral device, and the power contact point supplies an electric power output to the peripheral device according to the voltage signal.

10. The multiple functions transmitting apparatus of claim 1, wherein the ground contact point further comprises an electrical detecting device to detect types of the peripheral devices.

11. A multiple functions transmitting apparatus of a mobile phone utilizing a tubal socket and a column terminal for connecting a peripheral device to the mobile phone, the multiple functions transmitting apparatus comprising:
an identification transmission contact point with an identifying shape for identifying types of peripheral devices;
a first signal transmission contact point transmitting a first signal between the mobile phone and the peripheral device;
a second signal transmission contact point transmitting a second signal between the mobile phone and the peripheral device;
a ground transmission contact point for connecting with a system ground of the mobile phone; and
a plurality isolating elements positioned between the identification transmission contact point, the first signal transmission contact point, the second signal transmission contact point, and the ground transmission contact point to isolate therebetween,
wherein the identification transmission contact point, the first signal transmission contact point, the second signal transmission contact point, the ground transmission contact point, and the isolating elements are constructed on the column terminal.

12. The multiple functions transmitting apparatus of claim 11, wherein the column terminal further comprises a power transmission contact point supplying power between the mobile phone and the peripheral device.

13. The multiple functions transmitting apparatus of claim 11, wherein the multiple functions transmitting apparatus further comprises a tubal socket and the tubal socket includes:
a power contact point connecting with the power transmission contact point;
an identification contact point connecting with the identification transmission contact point;
a first signal contact point connecting with the first signal transmission contact point;
a second signal contact point connecting with the second signal transmission contact point; and
a ground contact point coupling with the ground system ground of the mobile phone to connect with the ground transmission contact point;
wherein the power contact point, the identification contact point, the first signal contact point, the second signal contact point, and the ground contact point are positioned in the tubal socket and isolated from each other.

14. The multiple functions transmitting apparatus of claim 13, wherein the ground contact point further comprises an electrical detecting device to detect types of the peripheral devices.

15. The multiple functions transmitting apparatus of claim 11, wherein the identifying shape includes the identification transmission contact point with a small diameter on the column terminal when the peripheral device is a microphone, and the mobile phone supplies power to the microphone of a handsfree headset by way of the identification contact point and the identification transmission contact point.

16. The multiple functions transmitting apparatus of claim 15, wherein the first signal is a first audio signal of the handsfree headset of the mobile phone.

17. The multiple functions transmitting apparatus of claim 15, wherein the second signal is a second audio signal of the handsfree headset of the mobile phone.

18. The multiple functions transmitting apparatus of claim 11, wherein the identifying shape includes the identification transmission contact point with a normal diameter on the column terminal, wherein:
when the voltage of the power contact point is higher than a predetermined voltage value, the peripheral device is a power supplier to charge the mobile phone; and
when the voltage of the power contact point is lower than the predetermined voltage value, the peripheral device is determined according to a voltage signal of the identification contact point.

19. The multiple functions transmitting apparatus of claim 18, wherein the voltage signal is set at a corresponding voltage value of the peripheral device to distinguish the peripheral device.

20. The multiple functions transmitting apparatus of claim 19, wherein the power contact point supplies an electric power output to the peripheral device according to the voltage signal.

* * * * *